(12) United States Patent
Fukuyama

(10) Patent No.: US 10,968,550 B2
(45) Date of Patent: Apr. 6, 2021

(54) TEXTILE SLEEVE WITH ADHESIVE FIXATION LAYER AND METHODS OF CONSTRUCTION AND USE THEREOF

(71) Applicant: FEDERAL-MOGUL POWERTRAIN LLC, Southfield, MI (US)

(72) Inventor: Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 16/564,080

(22) Filed: Sep. 9, 2019

(65) Prior Publication Data

US 2020/0002856 A1 Jan. 2, 2020

Related U.S. Application Data

(62) Division of application No. 14/863,201, filed on Sep. 23, 2015, now Pat. No. 10,407,807.
(Continued)

(51) Int. Cl.
*H02G 3/04* (2006.01)
*D04B 21/20* (2006.01)
(Continued)

(52) U.S. Cl.
CPC ............. *D04B 21/205* (2013.01); *C09J 7/21* (2018.01); *C09J 7/32* (2018.01); *D03D 1/0035* (2013.01);
(Continued)

(58) Field of Classification Search
CPC .......... D04B 21/205; D04B 1/225; C09J 7/21; C09J 7/32; C09J 2301/16; C09J 2301/306;
(Continued)

(56) References Cited

U.S. PATENT DOCUMENTS 4,714,723 A * 12/1987 Hoppe ................... C09J 101/28
524/42
5,108,815 A 4/1992 Adams et al.
(Continued)

FOREIGN PATENT DOCUMENTS

CN 102459729 A 5/2012
JP 2000082341 A 3/2000
(Continued)

*Primary Examiner* — Jeffry H Aftergut
(74) *Attorney, Agent, or Firm* — Robert L. Stearns; Dickinson Wright, PLLC

(57) ABSTRACT

A protective textile sleeve for providing protection to an elongate member contained therein; a method of construction thereof, and a method of bonding at least a portion of the sleeve to at least one of itself and an elongate member extending through a cavity thereof is provided. The sleeve has a wall of interlaced yarn, with the wall having an outermost surface and an innermost surface. The innermost surface is configured to bound a cavity extending between opposite open ends. The sleeve further includes an adhesive coating bonded to at least a portion of at least one of the outermost and innermost surfaces. The adhesive coating has a first, dried non-adhesive state and a second, wetted adhesive state, wherein the second adhesive state is activated via application of a water-based liquid thereto.

2 Claims, 5 Drawing Sheets

Related U.S. Application Data

(60) Provisional application No. 62/054,797, filed on Sep. 24, 2014.

(51) Int. Cl.
    *D03D 1/00* (2006.01)
    *D03D 3/02* (2006.01)
    *D04B 1/22* (2006.01)
    *C09J 7/21* (2018.01)
    *C09J 7/32* (2018.01)

(52) U.S. Cl.
    CPC ............ *D03D 3/02* (2013.01); *D04B 1/225* (2013.01); *H02G 3/0481* (2013.01); *C09J 2301/16* (2020.08); *C09J 2301/306* (2020.08); *D10B 2331/042* (2013.01); *D10B 2331/301* (2013.01)

(58) Field of Classification Search
    CPC ...... H02G 3/0481; H02G 3/0406; H02G 9/04; H02G 9/06; D03D 1/0035; D03D 3/02; D10B 2331/042; D10B 2331/301
    See application file for complete search history.

(56) References Cited

U.S. PATENT DOCUMENTS

| | | | |
|---|---|---|---|
| 8,740,223 B1* | 6/2014 | Alpi | H02G 3/0481 |
| | | | 277/312 |
| 2002/0083820 A1* | 7/2002 | Greenhalgh | B32B 5/26 |
| | | | 87/8 |
| 2005/0069666 A1 | 3/2005 | Ferrand | |
| 2006/0289197 A1 | 12/2006 | Yabe | |
| 2007/0154684 A1 | 7/2007 | Baer | |
| 2008/0254264 A1* | 10/2008 | Yamaguchi | F16L 57/06 |
| | | | 428/193 |
| 2009/0148644 A1* | 6/2009 | Francis | C09J 7/29 |
| | | | 428/41.8 |
| 2009/0218002 A1* | 9/2009 | Kashihara | D03D 1/0035 |
| | | | 139/433 |
| 2010/0084179 A1* | 4/2010 | Harris | H02G 3/0481 |
| | | | 174/350 |
| 2010/0313989 A1 | 12/2010 | Kashihara | |
| 2015/0027623 A1* | 1/2015 | Malloy | B32B 37/025 |
| | | | 156/235 |

FOREIGN PATENT DOCUMENTS

| | | |
|---|---|---|
| JP | 2006327656 A | 12/2006 |
| JP | 2011513600 A | 4/2011 |

\* cited by examiner

FIG. 13A

Low-Viscosity Blended HM (Material structure)

| | | | Min. | Max. | Material Propery |
|---|---|---|---|---|---|
| Low-Viscosity HM Blend | ① PVA1 | 9002-89-5 | 26% | 28% | Low MP (115C) Low Saponification(49) & Polymerization degree(-) |
| | ② PVA2 | 9002-89-5 | 12% | 15% | High MP(230C), High Saponification(99.4) & Polymerization degree(-) |
| | ③ DE | Alcogum296V Acrylic Hycar Latex Elastomer V29 | 8% | 10% | 11% 4 Rubber materials blended(amorphous) |
| | ④ Glyceline99% | 56-81-5 | 2% | 2% | 3% Softener for PVA, Purity 99.8% |
| | ⑤ Distilled water | | | 45% | |
| Total | | | | 100% | |

FIG. 13B

High-Viscosity Blended HM (Material structure)

| | | | Min. | Max. | Material Propery |
|---|---|---|---|---|---|
| High-Viscosity HM Blend | ① PVA1 | 9002-89-5 | 48% | 50% | Low MP (115C) Low Saponification(49) & Polymerization degree(-) |
| | ② PVA2 | 9002-89-5 | 22% | 25% | High MP(230C), High Saponification(99.4) & Polymerization degree(-) |
| | ③ DE | Alcogum296V Acrylic Hycar Latex Elastomer V29 | 15% | 20% | 20% 4 Rubber materials blended(amorphous) |
| | ④ Glyceline99% | 56-81-5 | 4% | 5% | 6% Softener for PVA, Purity 99.8% |
| | ⑤ Distilled water | | | 0% | |
| Total | | | | 100% | |

TEXTILE SLEEVE WITH ADHESIVE FIXATION LAYER AND METHODS OF CONSTRUCTION AND USE THEREOF

CROSS-REFERENCE TO RELATED APPLICATION

This U.S. Divisional Application claims the benefit of U.S. Utility application Ser. No. 14/863,201, filed Sep. 23, 2015 and U.S. Provisional Application Ser. No. 62/054,797, filed Sep. 24, 2014, both of which are incorporated herein by reference in their entirety.

BACKGROUND OF THE INVENTION

1. Technical Field

This invention relates generally to protective textile sleeves for providing protection to elongate members contained therein, and more particularly to protective textile sleeves having an adhesive mechanism for fixing a portion of the sleeve to itself and/or to an elongate member extending therethrough.

2. Related Art

Protective textile sleeves for providing protection to elongate members extending therethrough are known. Typically, the protective sleeves are formed having one of a tubular wall having a circumferentially continuous wall, or a wrappable wall having opposite lengthwise extending edges configured to be wrapped into overlapping relation with one another. Depending on the type of aforementioned wall and end use, a portion of the sleeve can be fixed to itself or the elongate member extending therethrough via separately applied wrapped tape or glue applied during installation. The use of tape to secure the sleeve in place has various drawbacks, as it is costly from a material and labor standpoint, and it can also prove unsightly if not applied correctly. Further, the externally applied tape must be readily available during installation of the sleeve, otherwise the assembly process can be delayed, and further yet, the tape can become inadvertently damaged or ineffectively applied during assembly, such as by being inadvertently folded on itself or contaminated via dirty surroundings or hands during application, thus, adversely affecting the ability of the tape to reliably fix the sleeve as intended. The application of separately applied glue during assembly is also costly from a material and labor standpoint, and further requires being readily available during assembly of the sleeve, and can further add cost as a result of the need to provide drying time for the glue. In addition, glue lacks strength is elevated temperatures, and can prove messy in application, thereby leading to further cost associated with damage, repair and the necessary clean-up thereof.

SUMMARY OF THE INVENTION

In accordance with one aspect of the invention, a protective textile sleeve for providing protection to an elongate member contained therein is provided. The sleeve has a wall of interlaced yarn, with the wall having an outermost surface and an innermost surface. The innermost surface is configured to bound a cavity extending between opposite open ends. The sleeve further includes an adhesive coating bonded to at least a portion of at least one of the outermost and innermost surfaces. The adhesive coating has a first, dried non-adhesive state and a second, wetted adhesive state, wherein the second adhesive state is activated via application of a water-based liquid thereto.

In accordance with another aspect of the invention, the innermost surface of the wall can be entirely covered by the adhesive coating, thereby facilitating bonding the sleeve to both itself to maintain the sleeve in a wrapped configuration, and also to the elongate member extending through the sleeve to prevent relative movement between the sleeve and the elongate member.

In accordance with another aspect of the invention, the wall can be formed as a circumferentially continuous wall.

In accordance with another aspect of the invention, the wall can be formed having opposite edges extending lengthwise between the opposite ends of the sleeve, wherein the opposite edges are configured to be wrapped into overlapping relation with one another.

In accordance with another aspect of the invention, the opposite edges can be bonded in overlapping relation with one another with the water-based adhesive coating.

In accordance with another aspect of the invention, at least a portion of the innermost surface of the wall can be free of the water-based adhesive coating, thereby reducing the amount of adhesive coating used, which in turn reduces cost, and further allows the adhesive coating to be selective applied to only areas requiring bonding while allowing remaining areas to remain unbonded.

In accordance with another aspect of the invention, the water-based adhesive coating can be bonded to the innermost surface adjacent and along the opposite ends.

In accordance with another aspect of the invention, the water-based adhesive coating can be bonded to the innermost surface along at least one of the opposite edges to facilitate bonding the opposite edges in overlapping relation with one another.

In accordance with another aspect of the invention, the water-based adhesive coating can be bonded to the innermost surface along each of the opposite edges to facilitate bonding one of the edges to the elongate member and to facilitate bonding the opposite edges in overlapping relation with one another.

In accordance with another aspect of the invention, the water-based adhesive coating is activatable with straight water.

In accordance with another aspect of the invention, a method of constructing a textile protective sleeve is provided. The method includes interlacing yarn to form a wall having an innermost and outermost surface extending between opposite open ends; bonding a water-activatable adhesive coating to at least a portion of at least one the innermost and the outermost surfaces; and drying the adhesive coating to render the adhesive coating in a first, non-adhesive state, wherein the adhesive coating can be selectively activated via application of water thereto to bring the adhesive coating to a second, adhesive state for bonding to at least one of the wall and an elongate member extending through a cavity of the wall.

In accordance with another aspect of the invention, a method of bonding at least a portion of a textile sleeve to at least one of itself and an elongate member extending through a cavity of the sleeve, wherein the textile sleeve has a wall of interlaced yarn forming an innermost and outermost surface extending between opposite open ends and further has a dry adhesive coating on at least a portion of at least one of the innermost and outermost surface is provided. The method includes wetting the dry adhesive coating with water; and pressing the wetted adhesive coating into abutment with at least one of the innermost surface, the outermost surface and the elongate member and causing the adhesive coating to bond to the surface that it abuts.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 13A is a coating formulation in accordance with one presently preferred embodiment; and FIG. 13B is a coating formulation in accordance with another presently preferred embodiment.

DETAILED DESCRIPTION OF PRESENTLY PREFERRED EMBODIMENTS

Figure 1:
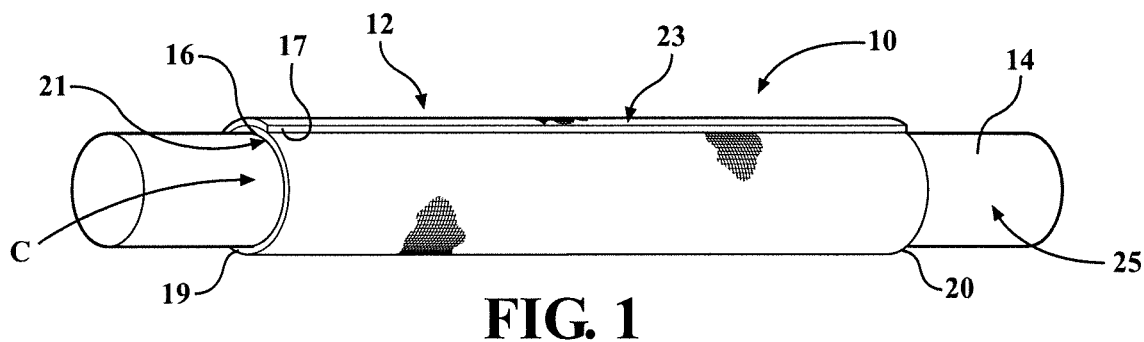
FIG. 1 is a perspective view of a textile sleeve constructed in accordance with one aspect of the invention with an elongate member extending therethrough.

Referring in more detail to the drawings, FIG. 1 illustrates a textile sleeve constructed in accordance with one aspect of the invention, shown as a wrappable sleeve, by way of example and without limitation, and referred to hereafter as sleeve 10. The sleeve 10 has a wrappable wall 12, such as a self-wrapping elongate wall that automatically curls into its wrapped configuration absent some externally applied force, for routing and protecting elongate members 14, such as a cable, wire harness, or tube, by way of example and without limitation. The elongate wall 12 has opposite inner and outer free edges 16, 17 extending generally parallel to a central, longitudinal axis 18 between opposite open ends 19, 20, wherein the edges 16, 17 can be biased into overlapping relation with one another in "cigarette wrapped" fashion to fully enclose the elongate member(s) 14 within a central cavity C of the sleeve 10. The wall 12 has an innermost face or surface, also referred to as inner surface 21, and an outermost face or surface, also referred to as outer surface 23, wherein the cavity C is bounded by the innermost surface 21 and is readily accessible along the full length of the longitudinal axis 18 so that the elongate member(s) 14 can be readily disposed radially into the cavity C, and conversely, removed from the cavity C, such as during service. To adhere and fix the wall 12 to itself to maintain the wall 12 in its closed, wrapped configuration and/or to the elongate member 14 to prevent relative movement between the wall 12 and the elongate member 14, and further, to facilitate preventing end fray of the opposite ends 19, 20, such as during cold cutting in manufacture and also during in use, the wall 12 has an adhesive coating layer, referred to hereafter as adhesive coating 22, bonded to at least a portion of at least one of the innermost surface 21 and the outermost surface 23. The adhesive coating 22 has a first, dried non-adhesive state upon first being applied to the wall 12 and subsequently dried, and a second, wetted adhesive state, wherein the second adhesive state is activated at a chosen time and location via application of a suitable water-based liquid thereto, and preferably straight water.

Depending on the application needs, the wall 12 can be constructed having any suitable size, including length and diameter. Further, the wall 12 can be formed of interlaced yarn using any desired interlacing process, such as braiding, weaving or knitting. If the wall 12 is formed as a self-wrapping wall, at least some of the weft-wise, circumferentially extending yarn, whether multifilament and/or monofilament, can be provided as any suitable heat-settable polymeric material, such as polyphenylene sulfide (PPS) or polyethyleneterephthalate (PET), for example.

To apply the mixture of the coating 22 to the wall 12, the mixture can be first formed as a pre-formed solid sheet of the coating 22 fabricated from the mixture, whereupon the solid sheet of the coating 22 can be subsequently laminated to the innermost surface 21 of the wall 12. Otherwise, the coating 22 of the mixture can be applied as a low viscosity coating formulation (FIG. 13A) or high viscosity coating formulation (FIG. 13B), such as via a spraying, rolling or dipping processes, by way of example and without limitation, directly on the desired area of the innermost and/or outermost surfaces 21, 23. Of course, it should be recognized the coating 22 can be applied to the entirety of the wall 12, if desired. When relative movement between the sleeve 10 and the elongate member 14 is to be prevented, the mixture of the coating 22 is applied and bonded to at least a portion of the innermost surface 21 that abuts directly against the elongate member 14, thereby providing the ability to bond the adhesive coating 22 to an outer surface 25 of the elongate member 14.

Upon applying, bonding, and drying the coating 22 to the desired areas of the wall 12, the wall 12 can be subsequently heat-set into a self-wrapping wall and/or wrapped about the elongate member 14. Otherwise, it should be recognized that the wall 12 can first be heat-set into a self-wrapping wall and then the wall 12 can be sprayed, dipped or otherwise coated with mixture of coating 22 in the desired areas. It should be recognized that upon the coating 22 being applied to the wall 12, the coating 22 attains its first, non-adhesive state upon being dried, and then, when desired, including after storing in inventory and/or shipping to the desired location where the sleeve 10 is to be disposed about the elongate member 14, the coating 22 can be selectively activated via application of a suitable liquid thereto, including water with the coating of FIGS. 13A and 13B. If the coating 22 is only applied to the ends 19, 20, the wall 12 can be bent in to a generally U-shaped configuration, and the ends 19, 20 can be dipped into a water-based liquid to activate the coating 22 on the ends 19, 20 for bonding to the elongate member 14 and/or to itself. Otherwise, the water-based liquid can be applied via any suitable mechanism, including brushing, dipping, spraying, or otherwise.

Figure 2:
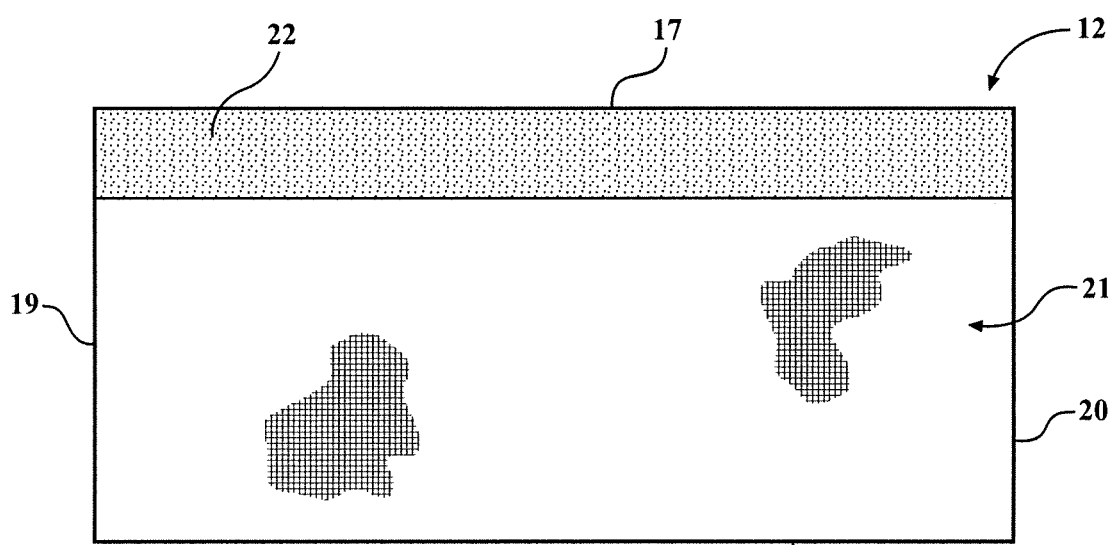
FIG. 2 is a plan view of an innermost surface of the wall of the textile sleeve of FIG. 1 constructed in accordance with one aspect of the invention.

In FIG. 2, one embodiment of the wall 10 is shown, wherein the coating 22 is applied along one of the edges, shown as being the outer edge 17, such that upon wrapping the wall 12 about the elongate member 14, the coating 22 can be bonded to the outer surface 23 of the wall 12 to fix the opposite edges 16, 17 in overlapping relation with one another. In the embodiment of FIG. 2, the wall 12 can be heat-set, as discussed above, or, given the coating 22 bonds the opposite edges 16, 17 in overlapping relation with one another, the "as manufactured and as supplied" wall 12 can remain substantially flat and non-heat-set.

Figure 3:
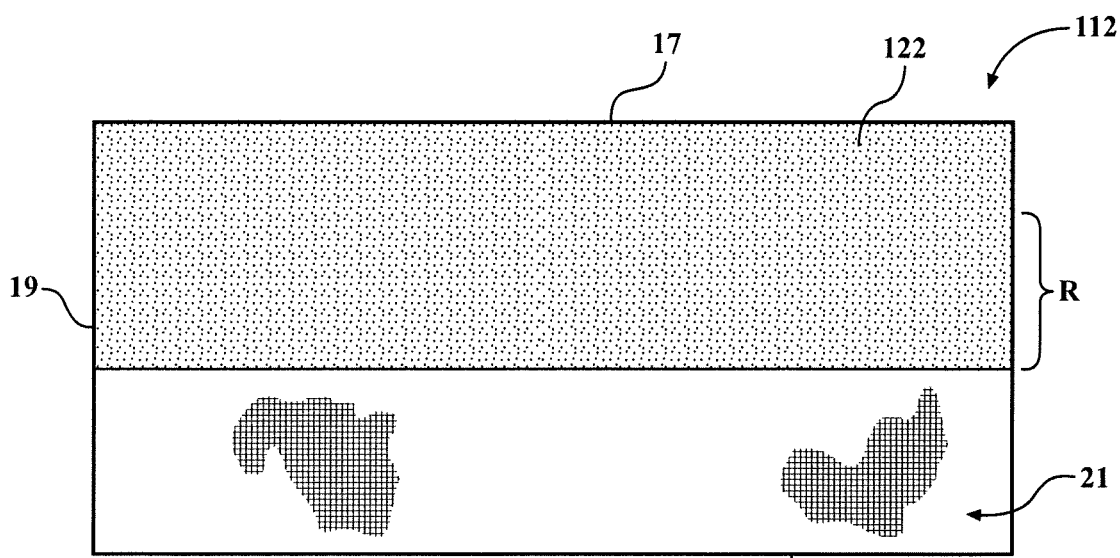
FIG. 3 is a plan view of an innermost surface of the wall of the textile sleeve of FIG. 1 constructed in accordance with another aspect of the invention.

In FIG. 3, another embodiment of a wall 112 is shown, wherein the same reference numerals as used above, offset by a factor of 100, are used to identify like features. The wall 112 has a coating 122 applied similarly as discussed above for the wall 12 of FIG. 2, however, the coating 122, in addition to extending along one of the edges, shown as the outer edge 17, the coating 122 is applied over a region R of the inner surface 21 that abuts the outer surface 25 of the elongate member 14 upon wrapping the wall 112 about the elongate member 14. As such, upon activating the coating 122, the coating 122 can be bonded to the outer surface 23 of the wall 112 to fix the opposite edges 16, 17 in overlapping relation with one another and also to the outer surface 25 of the elongate member 14 to bond the wall 112 to the elongate member 14 and fix the wall 112 against relative movement with the elongate member 14. As with the embodiment of FIG. 2, the wall 112 can be heat-set, as discussed above, or, given the coating 122 bonds the opposite edges 16, 17 in overlapping relation with one another, the "as manufactured and as supplied" wall 112 can remain substantially flat and non-heat-set.

Figure 4:
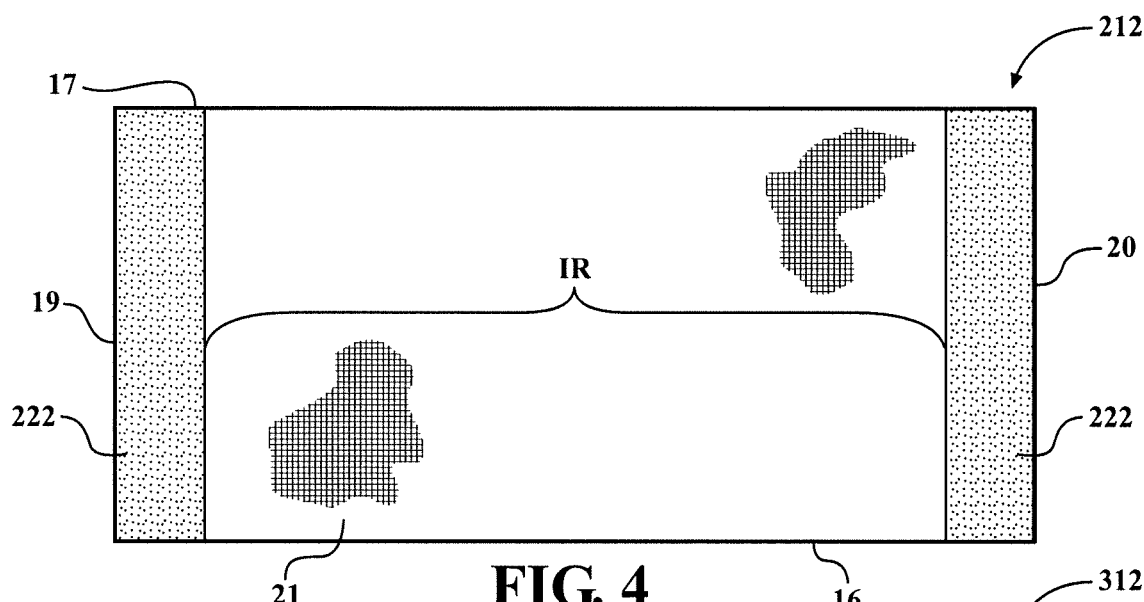
FIG. 4 is a plan view of an innermost surface of the wall of the textile sleeve of FIG. 1 constructed in accordance with another aspect of the invention.

In FIG. 4, another embodiment of a wall 212 is shown, wherein the same reference numerals as used above, offset by a factor of 200, are used to identify like features. The wall 212 has a coating 222 applied to extend along the opposite ends 19, 20, shown as extending along the entirety of the opposite ends 19, 20, with an intermediate region IR extending between the ends 19, 20 remaining free of the coating 222. As such, upon activating the coating 222, the coating 222 adjacent the outer edge 17 can be bonded to the outer surface 23 adjacent the opposite ends 19, 20 of the wall 212 to fix the opposite edges 16, 17 in overlapping relation with one another and the coating 222 adjacent the inner edge 16 can be bonded to the outer surface 25 of the elongate member 14 to bond the wall 212 to the elongate member 14 and fix the wall 212 against relative movement with the elongate member 14. As with the embodiment of FIG. 2, the wall 212 can be heat-set, as discussed above, or, given the coating 222 bonds the opposite edges 16, 17 in overlapping relation with one another, the "as manufactured and as supplied" wall 212 can remain substantially flat and non-heat-set.

Figure 5:
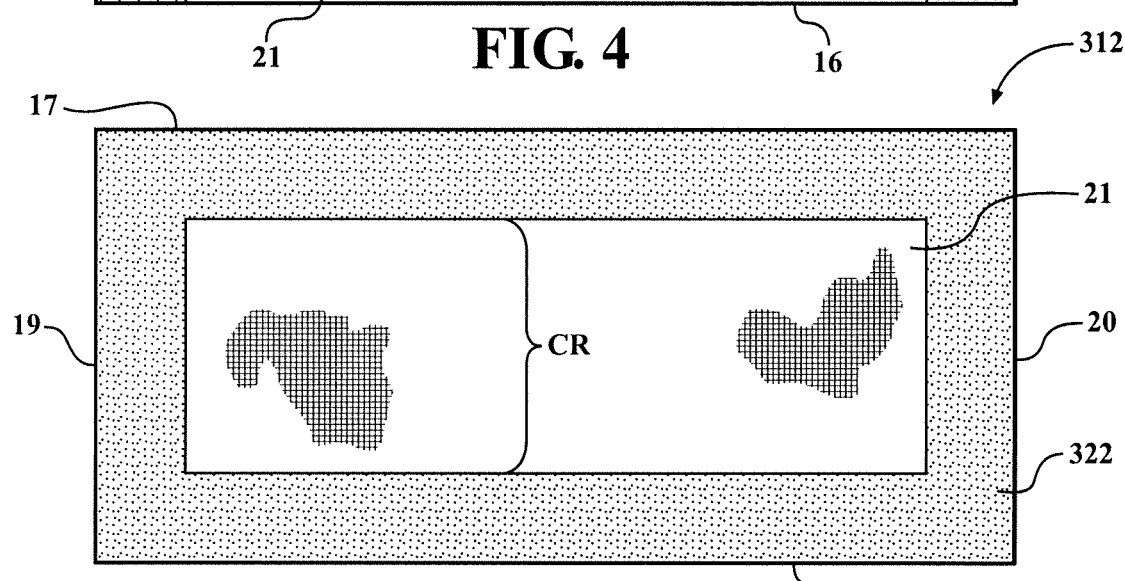
FIG. 5 is a plan view of an innermost surface of the wall of the textile sleeve of FIG. 1 constructed in accordance with another aspect of the invention.

In FIG. 5, another embodiment of a wall 312 is shown, wherein the same reference numerals as used above, offset by a factor of 300, are used to identify like features. The wall 312 has a coating 322 applied similarly as discussed above for the walls 12, 212 of FIGS. 2 and 4, however, the coating 322 is applied to extend along both of the inner and outer edges 16, 17 as well as along both of the opposite ends 19, 20, leaving only a bounded central region CR of the inner surface 21 uncoated. As such, upon activating the coating 322, the coating 322 extending along the outer edge 17 can be bonded to the outer surface 23 of the wall 312 along the full length of the wall 312 to bond and fix the opposite edges 16, 17 in overlapping relation with one another and also the coating 322 extending along the inner edge 16 and opposite ends 19, 20 can be bonded to the outer surface 25 of the elongate member 14 to bond the wall 312 to the elongate member 14 and fix the wall 312 against relative movement with the elongate member 14. As with the embodiment of FIG. 2, the wall 312 can be heat-set, as discussed above, or, given the coating 322 bonds the opposite edges 16, 17 in overlapping relation with one another, the "as manufactured and as supplied" wall 312 can remain substantially flat and non-heat-set.

Figure 6:
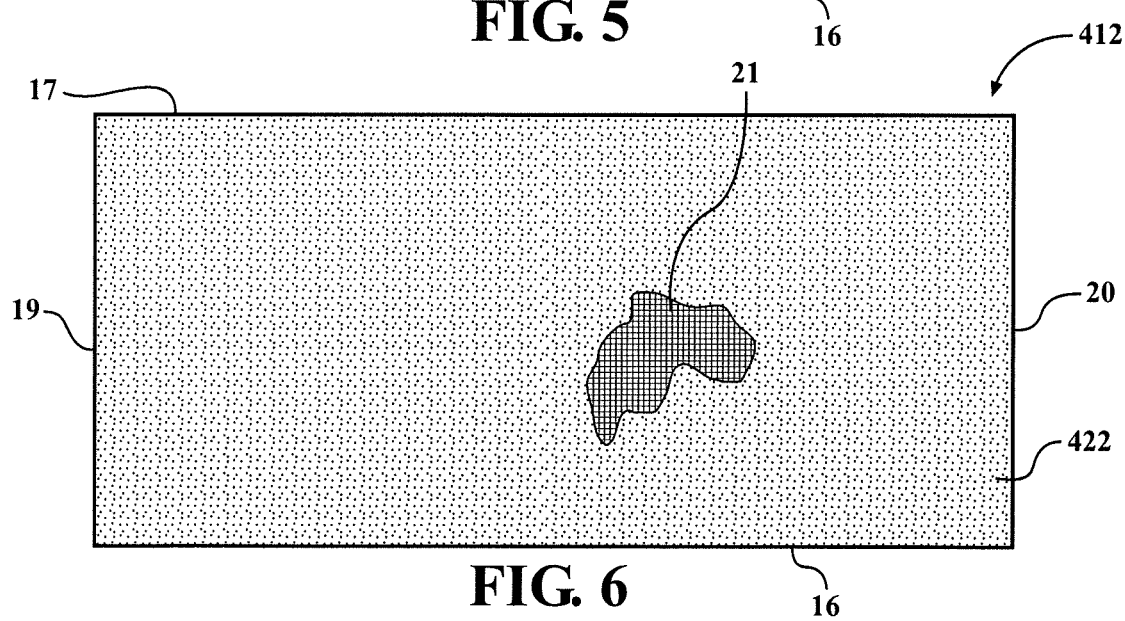
FIG. 6 is a partially broken away plan view of an innermost surface of the wall of the textile sleeve of FIG. 1 constructed in accordance with another aspect of the invention.

In FIG. 6, another embodiment of a wall 412 is shown, wherein the same reference numerals as used above, offset by a factor of 400, are used to identify like features. The wall 412 has a coating 422 applied similarly as discussed above, however, the coating 422 is applied to the entirety of the inner surface 21, and can be applied to cover the entirety of the outer surface 23, if desired. As such, upon activating the coating 422, the coating 422 extending adjacent the outer edge 17 can be bonded to the outer surface 23 of the wall 412 along the full length of the wall 412 to bond and fix the opposite edges 16, 17 in overlapping relation with one another and also the coating 422 extending over the entirety of the remaining portion of the wall 412 that comes into direct contact with the elongate member 14 can be bonded to the outer surface 25 of the elongate member 14 to bond the wall 412 to the elongate member 14 and fix the wall 412 against relative movement with the elongate member 14. As with the embodiment of FIG. 2, the wall 112 can be heat-set, as discussed above, or, given the coating 422 bonds the opposite edges 16, 17 in overlapping relation with one another, the "as manufactured and as supplied" wall 412 can remain substantially flat and non-heat-set.

Figure 7:
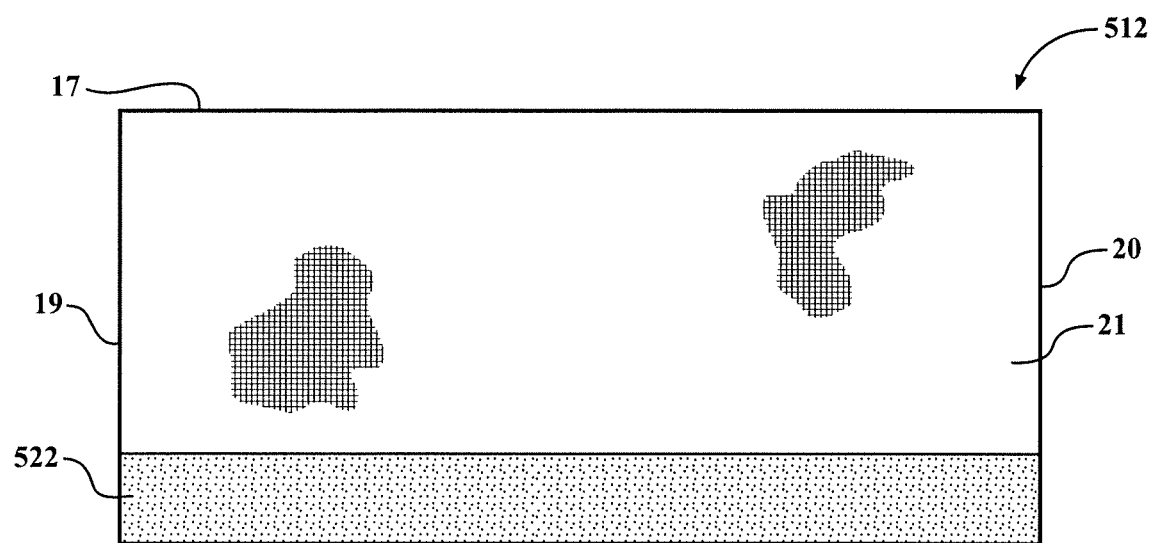
FIG. 7 is a plan view of an innermost surface of the wall of the textile sleeve of FIG. 1 constructed in accordance with another aspect of the invention.

In FIG. 7, another embodiment of a wall 512 is shown, wherein the same reference numerals as used above, offset by a factor of 500, are used to identify like features. The wall 512 has a coating 522 applied similarly as discussed above for the wall 12 of FIG. 2, however, rather than the coating 522 extending along the outer edge 17, the coating 522 is applied to extend along the inner edge 16 that abuts the outer surface 25 of the elongate member 14 upon wrapping the wall 512 about the elongate member 14. As such, upon activating the coating 522, the coating 522 can be bonded to the outer surface 25 of the elongate member 14 to bond the wall 512 to the elongate member 14 and fix the wall 512 against relative movement with the elongate member 14, and then the wall 512 can be wrapped about the elongate member 14 and fixed thereabout, as desired. As with the embodiment of FIG. 2, to facilitate maintaining the wall 512 in its wrapped configuration about the elongate member 14, the wall 512 can be heat-set to automatically bias the opposite edges 16, 17 into overlapping relation with one another.

Figure 8:
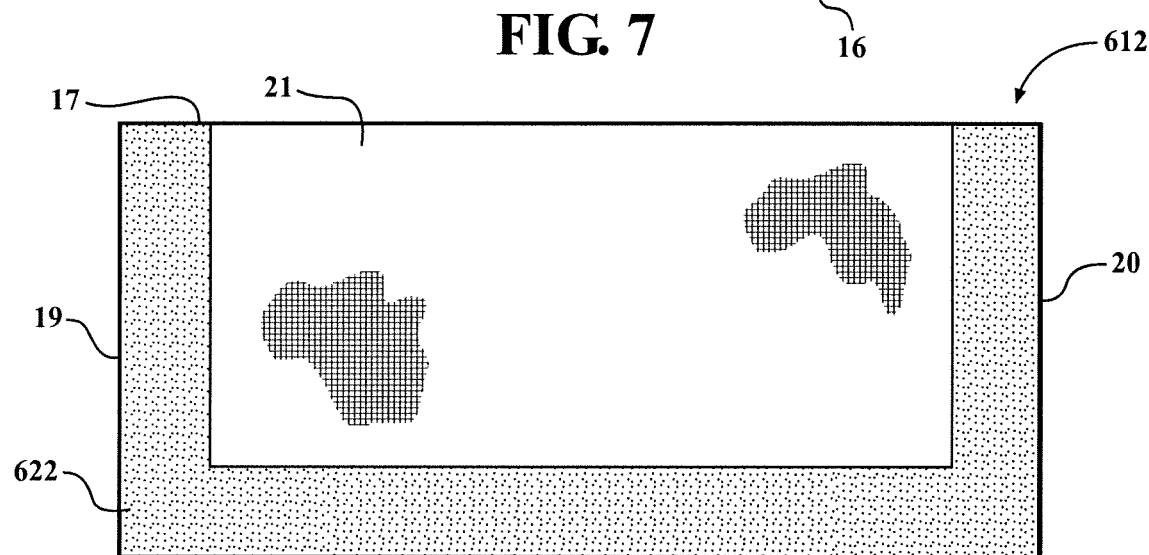
FIG. 8 is a plan view of an innermost surface of the wall of the textile sleeve of FIG. 1 constructed in accordance with another aspect of the invention.

In FIG. 8, another embodiment of a wall 612 is shown, wherein the same reference numerals as used above, offset by a factor of 600, are used to identify like features. The wall 612 has a coating 622 applied similarly as discussed above for the wall 512 of FIG. 7, however, in addition to the coating 622 extending along the inner edge 16, the coating 622 is applied to extend along the opposite ends 19, 20. As such, upon activating the coating 622, the coating 622 extending along the inner edge 16, as well as a portion of the coating 622 extending along the opposite ends 19, 20 can be bonded to the outer surface 25 of the elongate member 14 to bond the wall 612 to the elongate member 14 and fix the wall 612 against relative movement with the elongate member 14. Further, the region of the coating 622 overlapping the outer surface 23, upon bringing the opposite edges 16, 17 into overlapping relation with one another, can be bonded to the outer surface 23 to bond and fix the opposite edges 16, 17 in overlapping relation with one another. As with the embodiment of FIG. 2, to facilitate maintaining the wall 612 in its wrapped configuration about the elongate member 14, the wall 612 can be heat-set to automatically bias the opposite edges 16, 17 into overlapping relation with one another.

Figure 9:
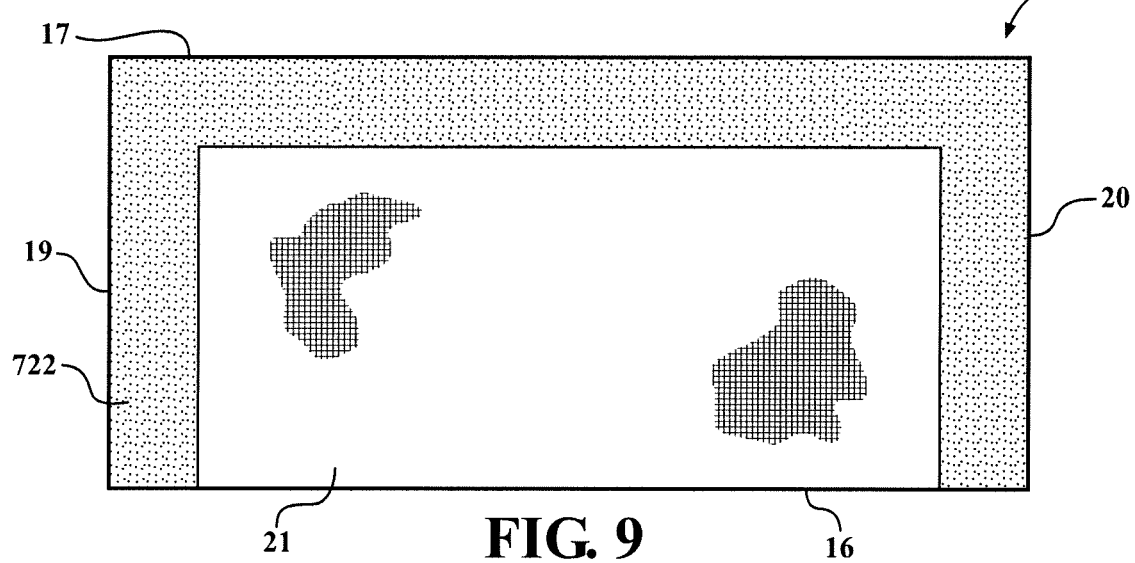
FIG. 9 is a plan view of an innermost surface of the wall of the textile sleeve of FIG. 1 constructed in accordance with another aspect of the invention.

In FIG. 9, another embodiment of a wall 712 is shown, wherein the same reference numerals as used above, offset by a factor of 700, are used to identify like features. The wall 712 has a coating 722 applied similarly as discussed above for the wall 612 of FIG. 8, however, rather than the coating 722 extending along the inner edge 16, the coating extends along the outer edge 17, and as with the wall 612, the coating 722 is applied to extend along the opposite ends 19, 20. As such, upon activating the coating 722, at least a portion of the coating 722 extending along the opposite ends 19, 20 can be bonded to the outer surface 25 of the elongate member 14 to bond the wall 712 to the elongate member 14 and fix the wall 712 against relative movement with the elongate member 14. Further, the coating 722 extending along the outer edge 17, upon bringing the opposite edges 16, 17 into overlapping relation with one another, can be bonded to the outer surface 23 to bond and fix the opposite edges 16, 17 in overlapping relation with one another. As with the embodiment of FIG. 2, to facilitate maintaining the wall 712 in its wrapped configuration about the elongate member 14, the wall 712 can be heat-set to automatically bias the opposite edges 16, 17 into overlapping relation with one another.

Figure 10:
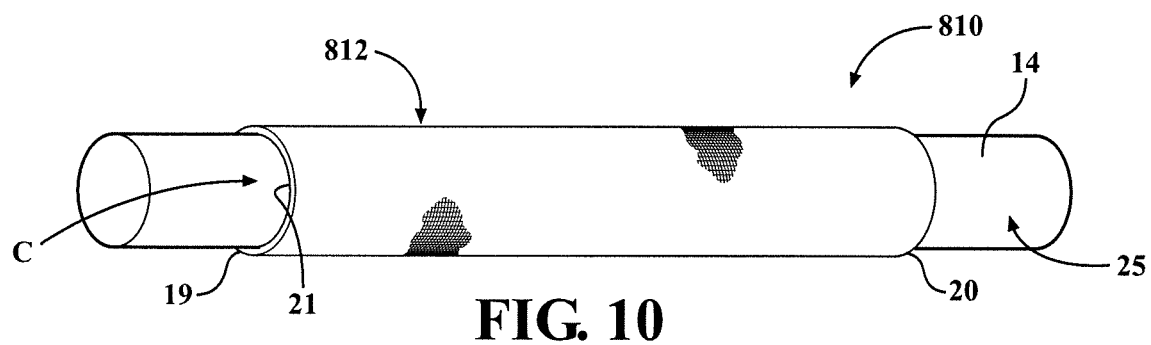
FIG. 10 is a perspective view of a textile sleeve constructed in accordance with yet another aspect of the invention fixed to an elongate member extending therethrough.
Figure 11:
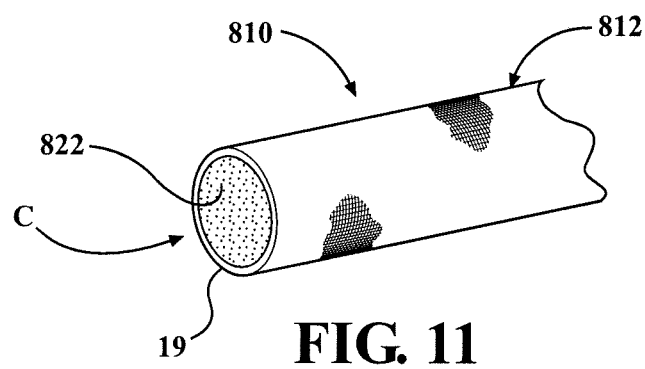
FIG. 11 is a partial perspective view of the sleeve of FIG. 10 constructed in accordance with one aspect of the invention.

FIG. 10 illustrates yet another embodiment of a textile sleeve 810 constructed in accordance with one aspect of the invention, wherein the same reference numerals as used above, offset by a factor of 800, are used to identify like features. The sleeve 810 has a circumferentially continuous tubular, edgeless wall 812 with an inner surface 21 bounding a cavity C in which an elongate member 14 is received and protected. As best shown in FIG. 11, the wall 812 has a coating 822 applied similarly as discussed above, wherein the coating 822 is shown as being applied to the inner surface 21 of the wall 812. As such, upon activating the coating 822, the elongate member 14 can be disposed within the cavity C and the coating 822 can be compressed into abutment with the outer surface 25 of the elongate member 14 to bond therewith, to bond the wall 812 to the elongate member 14 and fix the wall 812 against relative movement with the elongate member 14. It should be recognized that the coating 822 can be applied to cover the entirety of the inner surface 21, such as by pouting the water-based liquid coating material throughout the cavity C, or at least the end portions thereof adjacent opposite ends 19, 20 of the wall 812. Accordingly, not only does the coating 822 allow the wall 812 to be bonded with the elongate member 14, but it also acts to eliminate end fray when cutting the desired length of the sleeve 810 by bonding the filaments used to construct the wall 812 with one another. It should be recognized that all the embodiments discussed, having the coating along the opposite ends, facilitate the reduction of end fray during a cold-cutting operation.

Figure 12:
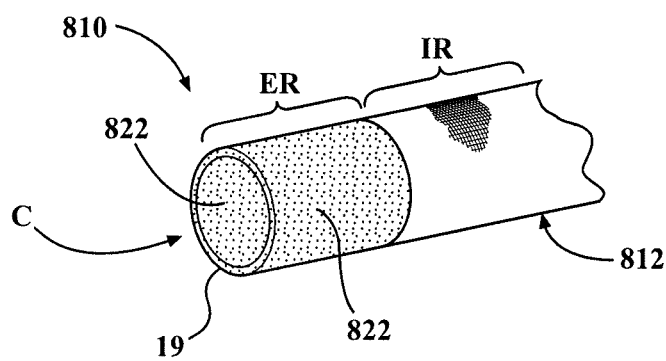
FIG. 12 is a partial perspective view of the sleeve of FIG. 10 constructed in accordance with another aspect of the invention.

As shown in FIG. 12, application of the coating 822 to the wall 812 can include dipping opposite ends 19, 20 of the wall 812 in a melted solution of the coating material and then allowing the dipped ends 19, 20 to dry and solidify, thereby forming the dry coating 822 on the end regions ER of the sleeve 810, with an intermediate region IR remaining free of the coating. Of course, if the ends 19, 20 are dipped, then an outer surface 23 of the wall 812 is also coated adjacent the opposite ends 19, 20, which further facilitates the prevention of end fray while cutting the wall 812. Of course, if desired, the entire wall 812 could be dipped in a solution of the coating material, thereby applying the coating 822 over the entire innermost and outer surfaces 21, 23 of the wall 812.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of constructing a textile protective sleeve, including:
    interlacing yarn to form a wall having opposite edges extending lengthwise between the opposite ends, said wall having an innermost surface and an outermost surface extending between said opposite ends, said opposite edges being configured to overlap one another to form a cavity bounded by said innermost surface;
    bonding a water-activatable adhesive coating along only one of said opposite edges and along both of said opposite ends with a region extending between said opposite edges and said opposite ends being free of said adhesive coating; and
    drying said adhesive coating to render said adhesive coating in a first, non-adhesive state, wherein said adhesive coating can be activated to a second, adhesive state by applying water thereto.

2. The method of claim 1 further including heat-setting the wall to bias the opposite edges into overlapping relation with one another.

* * * * *